(12) United States Patent
Estakhri et al.

(10) Patent No.: US 7,275,686 B2
(45) Date of Patent: Oct. 2, 2007

(54) ELECTRONIC EQUIPMENT POINT-OF-SALE ACTIVATION TO AVOID THEFT

(75) Inventors: Petro Estakhri, Pleasanton, CA (US); Siamack Nemazie, San Jose, CA (US); Ngon Le, Santa Clara, CA (US); Senthil Kumar Chellamuthu, Mountain View, CA (US); Jerrold Allen Beckmann, San Jose, CA (US); Anson Ba Phan, Fremont, CA (US); Ahuja Gurmukhsingh Ramesh, Livermore, CA (US)

(73) Assignee: Lexar Media, Inc., Fremont, CA (US)

( * ) Notice: Subject to any disclaimer, the term of this patent is extended or adjusted under 35 U.S.C. 154(b) by 153 days.

(21) Appl. No.: 11/012,785

(22) Filed: Dec. 14, 2004

(65) Prior Publication Data

US 2005/0133593 A1 Jun. 23, 2005

Related U.S. Application Data

(60) Provisional application No. 60/530,876, filed on Dec. 17, 2003.

(51) Int. Cl.
*G06F 7/08* (2006.01)

(52) U.S. Cl. .................. 235/381; 235/382; 235/492; 235/375

(58) Field of Classification Search ............ 235/381, 235/375, 384, 382, 380, 492; 705/64, 72
See application file for complete search history.

(56) References Cited

U.S. PATENT DOCUMENTS

| | | | |
|---|---|---|---|
| 4,099,069 A | 7/1978 | Cricchi et al. | |
| 4,130,900 A | 12/1978 | Watanabe | |
| 4,210,959 A | 7/1980 | Wozniak | 364/200 |
| 4,309,627 A | 1/1982 | Tabata | |
| 4,355,376 A | 10/1982 | Gould | 365/230 |
| 4,398,248 A | 8/1983 | Hsia et al. | |
| 4,405,952 A | 9/1983 | Slakmon | 360/49 |
| 4,414,627 A | 11/1983 | Nakamura | |
| 4,450,559 A | 5/1984 | Bond et al. | 371/10 |
| 4,456,971 A | 6/1984 | Fukuda et al. | 364/900 |
| 4,468,730 A | 8/1984 | Dodd et al. | |
| 4,473,878 A | 9/1984 | Zolnowsky et al. | |
| 4,476,526 A | 10/1984 | Dodd | |

(Continued)

FOREIGN PATENT DOCUMENTS

AU 0 557 723 1/1987

(Continued)

OTHER PUBLICATIONS

Magazine—Technology Updates, Integrated Circuits, "T=Mbit flash memories seek their role in system design", Ron Wilson, Senior Editor, Computer Design magazine 28 Mar. 1 (1989). No. 5., Tulsa OK, US pp. 30 and 32.

(Continued)

*Primary Examiner*—Ahshik Kim
(74) *Attorney, Agent, or Firm*—Leffert, Jay & Polglaze P.A.

(57) ABSTRACT

In accordance with an embodiment of the present invention, an electronic device is displayed for purchase by a user and includes a controller and a protected area for storing a key and a bar code associated with and for identifying the device including a password unique to the device, wherein upon purchase of the device, the password is compared to the key and upon successful activation thereof, the device is activated, otherwise, the device is rendered inoperable.

2 Claims, 10 Drawing Sheets

U.S. PATENT DOCUMENTS

| | | | |
|---|---|---|---|
| 4,498,146 A | 2/1985 | Martinez | 364/900 |
| 4,525,839 A | 6/1985 | Nozawa et al. | 371/38 |
| 4,532,590 A | 7/1985 | Wallach et al. | |
| 4,609,833 A | 9/1986 | Gutterman | |
| 4,616,311 A | 10/1986 | Sato | 364/200 |
| 4,654,847 A | 3/1987 | Dutton | 371/10 |
| 4,710,871 A | 12/1987 | Belknap et al. | 364/200 |
| 4,746,998 A | 5/1988 | Robinson et al. | 360/72.1 |
| 4,748,320 A | 5/1988 | Yorimoto et al. | 235/492 |
| 4,757,474 A | 7/1988 | Fukushi et al. | 365/189 |
| 4,774,700 A | 9/1988 | Satoh et al. | 369/54 |
| 4,780,855 A | 10/1988 | Iida et al. | |
| 4,788,665 A | 11/1988 | Fukuda et al. | |
| 4,797,543 A | 1/1989 | Watanabe | |
| 4,800,520 A | 1/1989 | Iijima | 364/900 |
| 4,829,169 A | 5/1989 | Watanabe | |
| 4,843,224 A | 6/1989 | Ohta et al. | |
| 4,896,262 A | 1/1990 | Wayama et al. | 364/200 |
| 4,914,529 A | 4/1990 | Bonke | 360/48 |
| 4,920,518 A | 4/1990 | Nakamura et al. | 365/228 |
| 4,924,331 A | 5/1990 | Robinson et al. | 360/72.1 |
| 4,943,745 A | 7/1990 | Watanabe et al. | |
| 4,953,122 A | 8/1990 | Williams | 364/900 |
| 4,970,642 A | 11/1990 | Yamamura | |
| 4,970,727 A | 11/1990 | Miyawaki et al. | |
| 5,016,274 A | 5/1991 | Micali et al. | |
| 5,070,474 A | 12/1991 | Tuma et al. | 395/500 |
| 5,093,785 A | 3/1992 | Iijima | |
| 5,168,465 A | 12/1992 | Harari | 257/320 |
| 5,180,902 A * | 1/1993 | Schick et al. | 235/380 |
| 5,198,380 A | 3/1993 | Harari | 437/43 |
| 5,200,959 A | 4/1993 | Gross et al. | 371/21.6 |
| 5,218,695 A | 6/1993 | Noveck et al. | |
| 5,220,518 A | 6/1993 | Haq | |
| 5,226,168 A | 7/1993 | Kobayashi et al. | 395/800 |
| 5,227,714 A | 7/1993 | Lou | |
| 5,253,351 A | 10/1993 | Yamamoto et al. | |
| 5,267,218 A | 11/1993 | Elbert | |
| 5,268,318 A | 12/1993 | Harari | 437/43 |
| 5,268,870 A | 12/1993 | Harari | 365/218 |
| 5,270,979 A | 12/1993 | Harari et al. | 365/218 |
| 5,293,560 A | 3/1994 | Harari | 365/185 |
| 5,297,148 A | 3/1994 | Harari et al. | 371/10.2 |
| 5,303,198 A | 4/1994 | Adachi et al. | 365/218 |
| 5,305,276 A | 4/1994 | Uenoyama | |
| 5,305,278 A | 4/1994 | Inoue | |
| 5,315,541 A | 5/1994 | Harari et al. | 365/63 |
| 5,315,558 A | 5/1994 | Hag | |
| 5,329,491 A | 7/1994 | Brown et al. | |
| 5,337,275 A | 8/1994 | Garner | 365/189.01 |
| 5,341,330 A | 8/1994 | Wells et al. | 365/185 |
| 5,341,339 A | 8/1994 | Wells | 365/218 |
| 5,341,341 A | 8/1994 | Fukazo | |
| 5,353,256 A | 10/1994 | Fandrich et al. | 365/230.03 |
| 5,357,475 A | 10/1994 | Hasbun et al. | 365/218 |
| 5,359,569 A | 10/1994 | Fujita et al. | |
| 5,365,127 A | 11/1994 | Manley | |
| 5,369,615 A | 11/1994 | Harari et al. | 365/218 |
| 5,371,702 A | 12/1994 | Nakai et al. | |
| 5,381,539 A | 1/1995 | Yanai et al. | |
| 5,382,839 A | 1/1995 | Shinohara | |
| 5,384,743 A | 1/1995 | Rouy | |
| 5,388,083 A | 2/1995 | Assar et al. | 365/218 |
| 5,396,468 A | 3/1995 | Harari et al. | 365/218 |
| 5,404,485 A | 4/1995 | Ban | |
| 5,406,527 A | 4/1995 | Honma | |
| 5,418,752 A | 5/1995 | Harari et al. | 365/218 |
| 5,422,842 A | 6/1995 | Cernea et al. | 365/185 |
| 5,422,856 A | 6/1995 | Sasaki et al. | |
| 5,428,621 A | 6/1995 | Mehrotra et al. | 371/21.4 |
| 5,430,682 A | 7/1995 | Ishikawa et al. | |
| 5,430,859 A | 7/1995 | Norman et al. | 395/425 |
| 5,431,330 A | 7/1995 | Wieres | |
| 5,434,825 A | 7/1995 | Harari | 365/185 |
| 5,438,573 A | 8/1995 | Mangan et al. | 371/10.3 |
| 5,465,235 A | 11/1995 | Miyamoto | |
| 5,465,338 A | 11/1995 | Clay | |
| 5,471,478 A | 11/1995 | Mangan et al. | 371/10.3 |
| 5,473,765 A | 12/1995 | Gibbons et al. | |
| 5,479,638 A | 12/1995 | Assar et al. | 395/430 |
| 5,485,595 A | 1/1996 | Assar et al. | 395/430 |
| 5,490,117 A | 2/1996 | Oda et al. | |
| 5,495,442 A | 2/1996 | Cernea et al. | 365/185.03 |
| 5,504,760 A | 4/1996 | Harari et al. | 371/40.1 |
| 5,508,971 A | 4/1996 | Cernea et al. | 365/185.23 |
| 5,513,138 A | 4/1996 | Manabe et al. | |
| 5,515,333 A | 5/1996 | Fujita et al. | |
| 5,519,847 A | 5/1996 | Fandrich et al. | |
| 5,523,980 A | 6/1996 | Sakui et al. | |
| 5,524,230 A | 6/1996 | Sakaue et al. | 395/430 |
| 5,530,673 A | 6/1996 | Tobita et al. | |
| 5,530,828 A | 6/1996 | Kaki et al. | |
| 5,530,938 A | 6/1996 | Akasaka et al. | |
| 5,532,962 A | 7/1996 | Auclair et al. | 365/201 |
| 5,532,964 A | 7/1996 | Cernea et al. | 365/189.09 |
| 5,534,456 A | 7/1996 | Yuan et al. | 437/43 |
| 5,535,328 A | 7/1996 | Harari et al. | 395/182.05 |
| 5,541,551 A | 7/1996 | Brehner et al. | |
| 5,544,118 A | 8/1996 | Harari | 365/218 |
| 5,544,356 A | 8/1996 | Robinson et al. | 395/600 |
| 5,552,698 A | 9/1996 | Tai et al. | |
| 5,554,553 A | 9/1996 | Harari | 437/43 |
| 5,563,825 A | 10/1996 | Cernea et al. | 365/185.18 |
| 5,566,314 A | 10/1996 | DeMarco et al. | 395/430 |
| 5,568,439 A | 10/1996 | Harari | 365/218 |
| 5,572,466 A | 11/1996 | Sukegawa | |
| 5,579,502 A | 11/1996 | Konishi et al. | |
| 5,581,723 A | 12/1996 | Hasbun et al. | |
| 5,583,812 A | 12/1996 | Harari | 365/185.33 |
| 5,592,415 A | 1/1997 | Kato et al. | |
| 5,592,420 A | 1/1997 | Cernea et al. | 365/185.18 |
| 5,596,526 A | 1/1997 | Assar et al. | |
| 5,598,370 A | 1/1997 | Niisima et al. | |
| 5,602,987 A | 2/1997 | Harari et al. | |
| 5,603,001 A | 2/1997 | Sukegawa et al. | |
| 5,606,660 A | 2/1997 | Estakhri et al. | |
| 5,611,067 A | 3/1997 | Okamoto et al. | |
| 5,640,528 A | 6/1997 | Harney et al. | |
| 5,642,312 A | 6/1997 | Harari | 365/185.33 |
| 5,648,929 A | 7/1997 | Miyamoto | |
| 5,663,901 A | 9/1997 | Wallace et al. | 365/52 |
| 5,693,570 A | 12/1997 | Cernea et al. | 437/205 |
| 5,712,819 A | 1/1998 | Harari | 365/185.29 |
| 5,719,808 A | 2/1998 | Harari et al. | 365/185.33 |
| 5,723,990 A | 3/1998 | Roohparvar | |
| 5,734,567 A | 3/1998 | Griffiths et al. | |
| 5,745,418 A | 4/1998 | Ma et al. | |
| 5,754,567 A | 5/1998 | Norman | |
| 5,757,712 A | 5/1998 | Nagel et al. | |
| 5,758,100 A | 5/1998 | Odisho | |
| 5,761,117 A | 6/1998 | Uchino et al. | |
| 5,768,190 A | 6/1998 | Tanaka et al. | |
| 5,768,195 A | 6/1998 | Nakamura et al. | |
| 5,773,901 A | 6/1998 | Kanter | |
| 5,778,418 A | 7/1998 | Auclair et al. | 711/101 |
| 5,781,478 A | 7/1998 | Takeeuchi et al. | |
| 5,787,445 A | 7/1998 | Daberko | |
| 5,787,484 A | 7/1998 | Norman | |
| RE35,881 E | 8/1998 | Barrett et al. | |
| 5,799,168 A | 8/1998 | Ban | |
| 5,802,551 A | 9/1998 | Komatsu et al. | |
| 5,809,515 A | 9/1998 | Kaki et al. | |
| 5,809,558 A | 9/1998 | Matthews et al. | |
| 5,809,560 A | 9/1998 | Schneider | |

| | | | | | | |
|---|---|---|---|---|---|---|
| 5,818,350 | A | 10/1998 | Estakhri et al. | 6,249,227 | B1 | 6/2001 | Brady et al. |
| 5,818,781 | A | 10/1998 | Estakhri et al. | 6,257,486 | B1 * | 7/2001 | Teicher et al. ............. 235/380 |
| 5,822,245 | A | 10/1998 | Gupta et al. | 6,262,918 | B1 | 7/2001 | Estakhri et al. |
| 5,822,252 | A | 10/1998 | Lee et al. | 6,272,610 | B1 | 8/2001 | Katayama et al. |
| 5,822,781 | A | 10/1998 | Wells et al. | 6,275,436 | B1 | 8/2001 | Tobita et al. |
| 5,831,929 | A | 11/1998 | Manning | 6,279,069 | B1 | 8/2001 | Robinson et al. |
| 5,835,935 | A | 11/1998 | Estakhri et al. | 6,279,114 | B1 | 8/2001 | Toombs et al. |
| 5,838,614 | A | 11/1998 | Estakhri et al. | 6,285,607 | B1 | 9/2001 | Sinclair |
| 5,845,313 | A | 12/1998 | Estakhri et al. | 6,298,236 | B1 * | 10/2001 | Yamada et al. ............. 455/434 |
| 5,847,552 | A | 12/1998 | Brown | 6,327,639 | B1 | 12/2001 | Asnaashari |
| 5,860,083 | A | 1/1999 | Sukeawa | 6,345,367 | B1 | 2/2002 | Sinclair |
| 5,860,124 | A | 1/1999 | Matthews et al. | 6,374,337 | B1 | 4/2002 | Estakhri |
| 5,862,099 | A | 1/1999 | Gannage et al. | 6,393,513 | B2 | 5/2002 | Estakhri et al. |
| 5,874,902 | A | 2/1999 | Heinrich et al. | 6,397,314 | B1 | 5/2002 | Estakhri et al. |
| 5,890,192 | A | 3/1999 | Lee et al. | 6,411,546 | B1 | 6/2002 | Estakhri et al. |
| 5,901,086 | A | 5/1999 | Wang et al. | 6,467,021 | B1 | 10/2002 | Sinclair |
| 5,907,856 | A | 5/1999 | Estakhri et al. | 6,467,684 | B2 * | 10/2002 | Fite et al. .................... 235/379 |
| 5,909,586 | A | 6/1999 | Anderson | 6,490,649 | B2 | 12/2002 | Sinclair |
| 5,920,884 | A | 7/1999 | Jennings, III et al. | 6,567,307 | B1 | 5/2003 | Estakhri |
| 5,924,113 | A | 7/1999 | Estakhri et al. | 6,578,127 | B1 | 6/2003 | Sinclair |
| 5,928,370 | A | 7/1999 | Asnaashari | 6,587,382 | B1 | 7/2003 | Estakhri et al. |
| 5,930,815 | A | 7/1999 | Estakhri et al. | 6,641,050 | B2 * | 11/2003 | Kelley et al. ................ 235/492 |
| 5,933,368 | A | 8/1999 | Ma et al. | 6,711,059 | B2 | 3/2004 | Sinclair et al. |
| 5,933,846 | A | 8/1999 | Endo | 6,725,321 | B1 | 4/2004 | Sinclair et al. |
| 5,936,971 | A | 8/1999 | Harari et al. | 6,728,851 | B1 | 4/2004 | Estakhri et al. |
| 5,937,425 | A | 8/1999 | Ban | 6,751,155 | B2 | 6/2004 | Gorobets |
| 5,953,737 | A | 9/1999 | Estakhri et al. | 6,757,800 | B1 | 6/2004 | Estakhri et al. |
| 5,956,473 | A | 9/1999 | Ma et al. | 6,813,678 | B1 | 11/2004 | Sinclair et al. |
| 5,959,926 | A | 9/1999 | Jones et al. | 6,832,720 | B2 * | 12/2004 | Dawson ....................... 235/381 |
| 5,966,727 | A | 10/1999 | Nishino et al. | 6,862,175 | B1 * | 3/2005 | McClendon et al. ......... 361/685 |
| 5,986,933 | A | 11/1999 | Takeuchi et al. | 6,898,662 | B2 | 5/2005 | Gorobets |
| 5,987,563 | A | 11/1999 | Itoh et al. | 6,912,618 | B2 | 6/2005 | Estakhri et al. |
| 5,987,573 | A | 11/1999 | Hiraka | 6,950,918 | B1 | 9/2005 | Estakhri |
| 5,991,849 | A | 11/1999 | Yamada et al. | 6,957,295 | B1 | 10/2005 | Estakhri |
| 5,995,006 | A | 11/1999 | Walsh | 6,973,519 | B1 | 12/2005 | Estakhri et al. |
| 6,011,322 | A | 1/2000 | Stumfall et al. | 6,978,342 | B1 | 12/2005 | Estakhri et al. |
| 6,011,323 | A | 1/2000 | Camp | 6,981,767 | B2 * | 1/2006 | Schmitt et al. .............. 347/106 |
| 6,018,265 | A | 1/2000 | Keshtbod | 7,000,064 | B2 | 2/2006 | Payne et al. |
| 6,021,408 | A | 2/2000 | Ledain et al. | 2002/0088855 | A1 | 7/2002 | Hodes |
| 6,026,020 | A | 2/2000 | Matsubara et al. | 2003/0004889 | A1 * | 1/2003 | Fiala et al. ..................... 705/64 |
| 6,026,027 | A | 2/2000 | Terrell, II et al. | 2003/0033471 | A1 | 2/2003 | Lin et al. |
| 6,034,897 | A | 3/2000 | Estakhri et al. | 2005/0198424 | A1 * | 9/2005 | Harari et al. ................ 710/301 |
| 6,035,357 | A | 3/2000 | Sakaki | | | | |
| 6,040,997 | A | 3/2000 | Estakrhi | | | | |

FOREIGN PATENT DOCUMENTS

| | | |
|---|---|---|
| 6,047,352 | A | 4/2000 | Lakhani et al. |
| 6,055,184 | A | 4/2000 | Acharya et al. | EP | 0 220 718 A2 | 5/1987 |
| 6,055,188 | A | 4/2000 | Takeuchi et al. | EP | 0 243 503 A1 | 11/1987 |
| 6,069,827 | A | 5/2000 | Sinclair | EP | 0 392 895 A2 | 10/1990 |
| 6,072,796 | A | 6/2000 | Christensen et al. | EP | 0 424 191 A2 | 4/1991 |
| 6,076,137 | A | 6/2000 | Asnaashari | EP | 0 489 204 A1 | 6/1992 |
| 6,081,447 | A | 6/2000 | Lofgren et al. | EP | 0 522 780 A2 | 1/1993 |
| 6,081,878 | A | 6/2000 | Estakhri et al. | EP | 0 544 252 A2 | 6/1993 |
| 6,084,483 | A | 7/2000 | Keshtbod | EP | 0 613 151 A2 | 8/1994 |
| 6,097,666 | A | 8/2000 | Sakui et al. | EP | 0 617 363 A2 | 9/1994 |
| 6,104,281 | A | 8/2000 | Heinrich et al. | EP | 0 619 541 A2 | 10/1994 |
| 6,115,785 | A | 9/2000 | Estakhri et al. | EP | 0 663 636 A1 | 7/1995 |
| 6,122,195 | A | 9/2000 | Estakhri et al. | EP | 0 686 976 A2 | 12/1995 |
| 6,125,424 | A | 9/2000 | Komatsu et al. | EP | 0 897 579 B1 | 7/2000 |
| 6,125,435 | A | 9/2000 | Estakhri et al. | EP | 0 891 580 B1 | 11/2000 |
| 6,128,695 | A | 10/2000 | Estakhri et al. | EP | 0 896 669 B1 | 11/2000 |
| 6,134,145 | A | 10/2000 | Wong | EP | 0 852 766 B1 | 5/2001 |
| 6,134,151 | A | 10/2000 | Estakhri et al. | EP | 0 852 765 B1 | 9/2001 |
| 6,141,249 | A | 10/2000 | Estakhri et al. | EP | 0 722 585 B1 | 5/2002 |
| 6,145,051 | A | 11/2000 | Estakhri et al. | EP | 0 910 826 B1 | 6/2002 |
| 6,151,247 | A | 11/2000 | Estakhri et al. | EP | 0 691 008 B1 | 11/2002 |
| 6,172,906 | B1 | 1/2001 | Estakhri et al. | EP | 0 861 468 B1 | 4/2003 |
| 6,173,362 | B1 | 1/2001 | Yoda | EP | 0 978 040 B1 | 5/2004 |
| 6,181,118 | B1 | 1/2001 | Meehan et al. | EP | 1 157 328 B1 | 5/2005 |
| 6,182,162 | B1 | 1/2001 | Estakhri et al. | FR | 93 01908 | 8/1993 |
| 6,202,138 | B1 | 3/2001 | Estakhri et al. | GB | 2 251 323 A | 7/1992 |
| 6,223,308 | B1 | 4/2001 | Estakhri et al. | GB | 2 291 990 A | 2/1996 |
| 6,226,708 | B1 | 5/2001 | McGoldrick et al. | GB | 2 291 991 A | 7/1996 |
| 6,230,234 | B1 | 5/2001 | Estakhri et al. | GB | 2 297 637 A | 7/1996 |

| | | |
|---|---|---|
| GB | 2 304 428 A | 3/1997 |
| GB | 2 348 991 B | 12/2002 |
| GB | 2 351 822 B | 1/2003 |
| GB | 2 384 337 A | 7/2003 |
| GB | 2 384 883 A | 10/2005 |
| GB | 2 384 338 B | 11/2005 |
| GB | 2 384 072 B | 12/2005 |
| GB | 2 411 499 B | 2/2006 |
| IS | 117881 | 5/2003 |
| JP | 62-283496 | 12/1987 |
| JP | 1-138694 A | 5/1989 |
| JP | 3-228377 A | 10/1991 |
| JP | 4-57295 A | 2/1992 |
| JP | 4-254994 A | 9/1992 |
| JP | 4-268284 A | 9/1992 |
| JP | 4-278297 A | 10/1992 |
| JP | 5-128877 A | 5/1993 |
| JP | 5-282883 A | 10/1993 |
| JP | 6-36578 A | 2/1994 |
| JP | 6-124175 A | 5/1994 |
| JP | 6-124231 A | 5/1994 |
| JP | 6-131889 A | 5/1994 |
| JP | 6-132747 A | 5/1994 |
| JP | 6-149395 A | 5/1994 |
| JP | 6-266596 A | 9/1994 |
| JP | 7-93499 A | 4/1995 |
| JP | 7-311708 A | 11/1995 |
| JP | 8-18018 A | 1/1996 |
| JP | 8-69696 A | 3/1996 |
| JP | 9-147581 A | 6/1997 |
| SU | 1388877 A1 | 4/1988 |
| SU | 1408439 A1 | 7/1988 |
| SU | 1515164 A1 | 10/1989 |
| SU | 1541619 A1 | 2/1990 |
| SU | 1573458 A2 | 6/1990 |
| SU | 1686449 A2 | 10/1991 |
| WO | WO84/00628 | 2/1984 |
| WO | WO94/20906 A1 | 9/1994 |

OTHER PUBLICATIONS

1992 Symposium of VLSI Circuits Digest of Technical Papers, "EEPROM for Solid State Disk Applications", S. Mahoura et al., Sundisk Corporation, Santa Clara, CA. R.W. Gregor et al., AT&T Bell Laboratories, Allentown, PA. pp. 24 and 25.
Mendel Rosenblum and John K. Ousterhout, The Design and Implementation of a Log-Structured File System, article, 1991, 15 pgs., Berkeley, USA.
Brian Dipert and Markus Levy, Designing with Flash Memory, book, Apr. 1994, 445 pgs., Annabooks, San Diego, USA.
Science Forum, Inc., Flash Memory Symposium '95, symposium, 1995,13 pgs.; Hongo, Bunkyo-ku, Tokyo.
Ross S. Finlayson and David R. Cheriton, An Extended File Service Exploiting Write-Once Storage, article, 1987, 10 pgs. ACM.
Jason Gait, The Optical File Cabinet: A Random-Access File System for Write-Once Optical Disks, article, Jun. 1988, 12 pgs., Beaverton, Oregon.
Henry G. Baker, Memory Management, book, 1995, 19 pgs., Springer-Verlag Berlin Heidelberg, Germany.
Sape J. Mullender and Andrew S. Tanenbaum, A Distributed File Service Based on Optimistic Concurrency Control, article, 1985, 12 pgs., ACM.
Hiroshi Nakamura, Junichi Miyamoto, Kenichi Imamiya and Yoshihisa Iwata, A Novel Sense Amplifier for Flexible Voltage Operation NAND Flash Memories, symposium, 1995, VLSI Circuits Digest of Technical Papers, 2 pgs.
Hiroshi Nakamura, Junichi Miyamoto, Kenichi Imamiya, Yoshihisa Iwata, Yoshihisa Sugiura and Hideko Oodaira, A Novel Sensing Scheme with On-Chip Page Copy for Flexible Voltage NAND Flash Memories, article, Jun. 1996, 9 pgs.., vol. E79-C, No. 6.
Takaaki Nozaki, Toshiaki Tanaka, Yoshiro Kijiya, Eita Kinoshita, Tatsuo Tsuchiya and Yutaka Hayashi, A 1-Mb EEPROM with MONOS Memory Cell for Semiconductor Disk Application, article, 1991, 5 pgs., Journal Of Solid—State Circuits, vol. 26, No. 4.
Kai Hwang and Faye A. Briggs, Computer Architecture and Parallel Processing, book, 1984, McGraw-Hill, Inc., 2 pgs., US.
Walter Lahti and Dean McCarron, State of the Art: Magnetic VS. Optical Store Data in a Flash, article, 1990, 7 pgs., vol. 15, No. 12, McGraw-Hill, Inc., US.
Ron Wilson, Integrated Circuits; 1-Mbit flash memories seek their role in system design, article, Mar. 1, 1989, 2 pgs., No. 6, Tulsa, OK.
S. Mehroura, J.H. Yuan, R.A. Cemea, W.Y. Chien, D.C. Guteman, G. Samachisa, R.D. Noman, M. Mofidi, W.Lee, Y. Fong, A. Mihnea , E. Hann, R.W. Gregor, E.P. Eberhardt, J.R. Radosevich, K.R. Stiles, R.A. Kohler, C.W. Leung, and T.J. Mulrooney, Serial 9Mb F EEPROM for Solid State Disk Applications, symposium, 1992, 2 pgs., Mountain View, CA.
Steven H. Leibson, Nonvolatile, in-circuit-reprogrammable memories, article, Jan. 3, 1991, 12 pgs., EDN, Circle No. 12.
Walter Lahti and Dean McCarron, State of the Art: Magnetic VS. Optical Store Data in a Flash, article, 1990, 7 pgs., vol. 15, No. 12, McGraw-Hill, Inc., US.
Kai Hwang and Faye A. Briggs, Computer Architecture and Parallel Processing, book, 1984, McGraw-Hill, Inc., 2 pgs., US.
Steven H. Leibson, Nonvolatile, in-circuit-reprogrammable memories, article, Jan. 3, 1991, 12 pgs., EDN, Circle No. 12.
Ramon Caceres, Fred Douglis, Kai Li and Brian Marsh, Operating System Implications of Solid-State Mobile Computers, article, 7 pgs., Oct. 1993, Workshop on Workstation Operting Systems.
Michael Wu and Wily Zwaenepoel, A Non-Volatile, Main Memory Storage System, 12 pgs., 1994, ACM, San Jose, CA USA.
Dave Bursky, Innovative flash memories match DRAM densities: available with a choice of features, flash memories are finding homes in many systems (includes related articles on the origins of flash, and on the differences between NAND and NOR flash memories), article, May 16, 1994, 9 pgs., Electronic Design, v.42, n.10, The Gale Group.
Anthony Cataldo, New flash enhancements up ante. (Intel's 28F400BV-120 and 28F004BV-120, Atmel's AT298V010 and AT29BV020, and Samsung Semiconductor's KM29V32000 * flash* memory* devices)(Product Announcement), article, Mar. 13, 1995, 4 pgs., Electronic News, v.41, n.2058, The Gale Group.
Sam Weber, *Flash* modules' portability, reusability, small size valued for a host of APPs-Consumer formats flocking to *flash*, article, Jul. 22, 1996, 9 pgs., Electronic Engineering Times, n.911, CMP Media.
Toshiba, MOS Memory (Non-Volatile), 1995, Data Book.
Stan Baker, But Integration Calls for Hardware, Software Changes: Flash; designers face the dawn of a new memory age, article, Sep. 12, 2003, 5 pgs., Electronic Engineering Times, 1990, N.619, 41, CMP Media.
Toshiba, Toshiba MOS Digital Integrated Circuit Silicon Gate CMOS, (TC58NS512DC) Mar. 21, 2001, 43 pgs., Data Book.
Toshiba Corporation, SMIL (Smartmedia Interface Library) Hardware Edition Version 1.00, Jul. 1, 2000, 36 pgs., Data Book.
Toshiba, Toshiba MOS Digital Integrated Circuit Silicon Gate, (TC58512FT), Mar. 5, 2001, 43 pgs., Data Book.
Toshiba, Toshiba MOS Digital Integrated Circuit Silicon Gate, (TC58DVM92A1FT00), Jan. 10, 2003, 44 pgs., Data Book.
Toshiba, Toshiba MOS Digital Integrated Circuit Silicon Gate, (TC58DVG02A1FT00), Jan. 10, 2003, 44 pgs., Data Book.
Toshiba, Toshiba MOS Digital Integrated Circuit Silicon Gate, (TH58100FT), Mar. 5, 2001, 43 pgs., Data Book.
35Nonvolatile Memory Technology Review, A Time of Change, Proceedings 1993 Conference, Jun. 22-24, 1993, Linthicum Heights, MD USA.
Toshiba Corporation, SMIL (Smartmedia Interface Library) Software Edition Version 1.00, Jul. 1, 2000, 136 pgs., Data Book.
Toshiba, MOS Memory (Non-Volatile), 1996, 279 pgs., Data Book.
Dan Auclair, Optimal Solid State Disk Architecture For Portable Computers, symposium, Jul. 9, 1991, 7 pgs., SunDisk Corporation.

* cited by examiner

RETAIL LEVEL

FIG. 11

USER LEVEL
Home Activation

Kiosk Activation

RETAIL LEVEL

FIG. 15

USER / CONTROLLER LEVEL

FIG. 16

ELECTRONIC EQUIPMENT POINT-OF-SALE ACTIVATION TO AVOID THEFT

CROSS REFERENCE TO RELATED APPLICATION

This application claims the benefit of a previously filed U.S. Provisional Patent Application No. 60/530,876, filed on Dec. 17, 2003 and entitled "Electronic Equipment Point-of-Sale Activation To Avoid Theft", the disclosure of which is hereby incorporated by reference as though set forth in full.

BACKGROUND OF THE INVENTION

1. Field of the Invention

The present invention relates generally to activation of electronic equipment, purchased by consumers, to avoid theft and particularly to activation of such electronic equipment at the point-of-sale thus allowing such electronic equipment to be displayed in the open, in a self-serve setting, yet avoiding theft of the same.

2. Description of the Prior Art

It has become customary and, in fact, prevalent to sell electronic equipment at retail stores that in the past did not participate in such sales. For example, retail stores, such as Walmart, Kmart, Walgreens, etc., regularly sell complex and sophisticated electronic cards as a big part of their retail sales. Flash cards fall into the category of such complex electronic cards and are thus an example of electronic card sales at the foregoing and other retail stores.

Flash cards and other types of electronic cards have become small in size throughout the years as modern technology advances and reaches new transistor size reductions. Due to the complexity and size of these types of cards, they are rather expensive. Sales of such cards is however, best done on a self-serve basis. That is, in the retail store, the customer generally likes to see the product at a location where it can be readily picked up and observed prior to purchase thereof as opposed to presented behind a locked window counter where a salesperson is required to present the product to the customer.

Self-serve sales of expensive electronic equipment, such as complex electronic cards, has posed a major problem to retail stores in that they can be easily stolen. This is particularly true of smaller-sized products, such as flash cards, as they can be easily hidden. Indeed, it has been shown, that fifty percent of shoplifting is performed by either casual shoppers or employees of the store. The amount of loss due to theft has risen and is now astronomical.

Thus, the need arises for a method and apparatus to avoid theft of electronic equipment at stores by activating the equipment only at the point-of-sale such that the equipment is inoperational prior to the activation thus discouraging the general public from inappropriately taking the equipment from the store.

SUMMARY OF THE INVENTION

Briefly, an embodiment of the present invention includes an electronic device displayed for purchase by a user, which includes a controller and a protected area for storing a key and a bar code associated with and for identifying the device including a password unique to the device, wherein upon purchase of the device, the password is compared to the key and upon successful activation thereof, the device is activated, otherwise, the device is rendered inoperable.

The foregoing and other objects, features and advantages of the present invention will be apparent from the following detailed description of the preferred embodiments which make reference to several figures of the drawing.

DETAILED DESCRIPTION OF THE PREFERRED EMBODIMENTS

Figure 1:
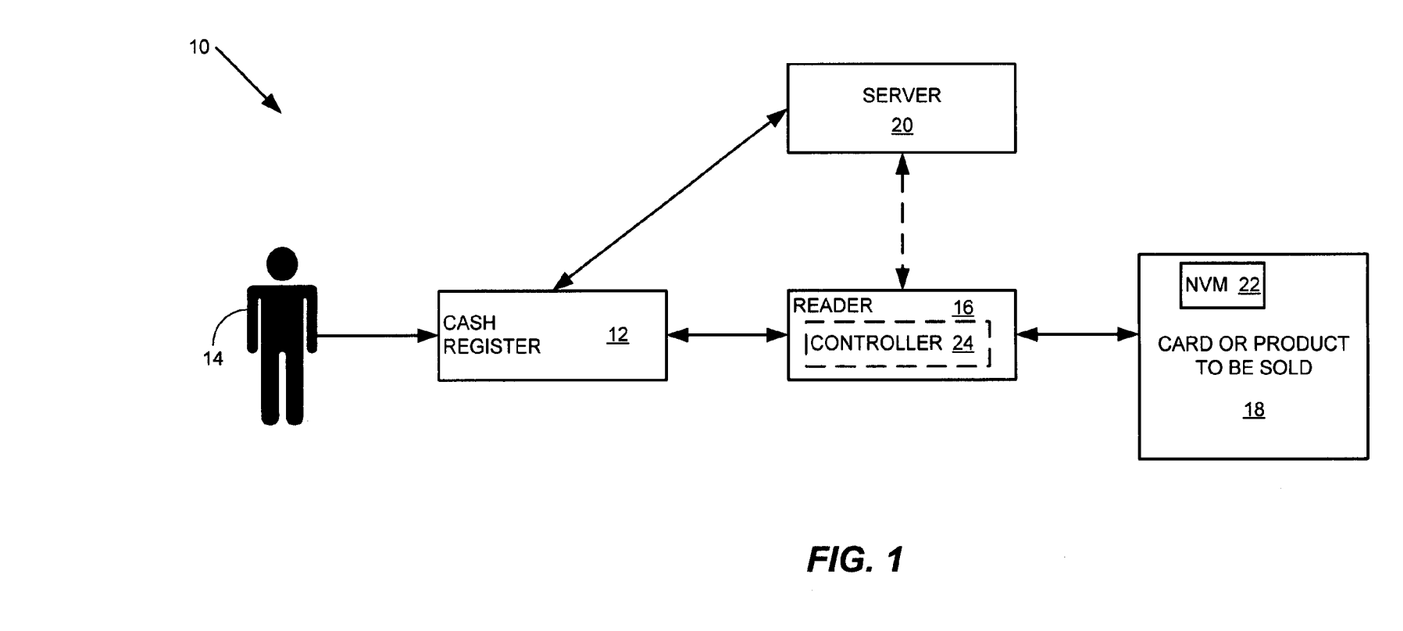
FIG. 1 shows an embodiment of the present invention using the "smart" card.

Referring now to FIG. 1, an electronic card activation system 10 is shown to include a cash register 12, for use by a cashier 14, a reader 16, a card or product to be sold 18 and a server 20, in accordance with an embodiment of the present invention.

The cashier 14 is shown to operate the cash register 12, which is used to ring up or account for the sale of the card or product 18. The cash register 12 is shown coupled to the reader 16, which is shown coupled to the card 18. The server 20 is shown coupled to the cash register 12. The system 10 is typically located inside of a retail store although the server 20 may be physically located outside of the store, in perhaps, a remote central location with other servers serving all of the branches of the retail chain. The server 20 communicates with the reader 16 through the cash register 12. Alternatively, the server 20 is coupled for communication with the reader 16 directly.

In operation, a potential customer of the card 18 (not shown in FIG. 1) chooses to purchase the card 18 and thus presents the card to the cashier 14 for purchase thereof. The card 18 is first authenticated, a step well known to those of ordinary skill in the art. The card 18 is then placed in the reader 16 where it is determined that activation of the card 18 is required prior to proper operation thereof. This is done by reading the bar code that appears on the card 18. That is, the particular bar code, appearing on the card 18, indicates to the reader 16 that the card is yet to be activated, prior to proper operation.

If the card 18 was purchased by bypassing the reader 16, the cashier would read the bar code of the card 18, through the cash register 12, and communicate this information to the server 20, which would determine that the card 18 is inoperable unless activated, thus, sale of the card to the customer would be avoided until such activation occurred. This is one method and apparatus of the present invention.

Another method and apparatus is to have a host device read the information on the card and the host, through a command, enables the card.

The reader 16 optionally includes a controller circuit 24. The need for the controller 24 is based on the type of card or product that the card (or product) 18 is known to be. In one embodiment of the present invention, the card 18 is other than a "smart" card indicating that it includes memory as well as a controller circuit in which case the reader 16 may not include the controller circuit 24. In fact, the card can activate itself, as will be discussed later. The latter embodiment is shown in FIG. 2.

In another embodiment of the present invention, as shown in FIG. 1, the card 18, while including memory, does not include a controller circuit. In this case, the reader 16 will need to include the controller circuit 24. Preferably, the reader 16 includes the controller circuit 24 so as to be able to accommodate non-smart cards as well as smart cards (different form factors) that do not have a controller circuit.

Figure 2:
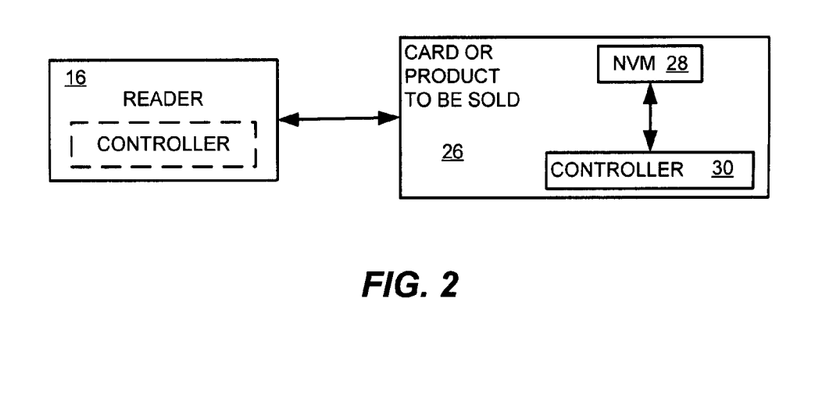
FIG. 2 shows an alternative embodiment of the present invention.

Once the card 18 has been placed in the reader 16, the former is interrogated by the latter as to whether or not a controller is included within the card 18, as shown in FIG. 2, within the card 26, where the controller 30 is shown to be coupled to the non-volatile memory 28. In the embodiment of FIG. 2, encrypted communication is used between the server 20 (of FIG. 1) and the card. It should be noted that while not shown, the coupling and structures of FIG. 1 apply to FIG. 2 except for those already shown in FIG. 2.

In the embodiment of FIG. 2, the card 26 activates itself. Activation will be discussed in further detail below. Once a card has been activated, whether the card is a "smart card", i.e. does not include a controller, or otherwise, an area in the memory of the card is reserved by the reader 16, which includes "purchase" information regarding the card. The "purchase" information is typically unique to the card being purchased by the consumer or customer. Examples of the information included within the "purchase" information are the purchase price of the card, the particular store in which the card is being sold, the location of the store in which the card is being purchased, time of purchase of the card, the person or customer to which the card is being sold, and the like. Such "purchase" information can prove to be valuable to retail store owners in that they help to provide valuable inventory information. Alternatively, such "purchase" information is stored in a server, such as server 20 of FIG. 1. For example, a collection of such "purchase" information of a large number of sales of cards in a particular store is perhaps indicative of the need for additional cards in the particular store. This information can prove valuable to the manufacturer of such cards or electronic equipment, as the latter can be assessed by its manufacturing requirements and thus avoid over-stocking or under-stocking.

Even more importantly, the "purchase" information provides information regarding the legitimacy of the sale in that the information would provide when the card was purchased, by whom, the location of the sale, etc. The "purchase" information, once residing in the reserved area of the memory of the card, can only be read by the reader 16 and no other application will have access to it. To other applications, the reserved area may appear to be "defective", whereas to the reader 16 and only to the reader 16, it includes the "purchase" information and can be read accordingly this reserved area can also be designed to include specific information regarding the type of camera or digital application which the customer has purchased and it would enable the customer to download specific drivers or software from a web site where it would enhance the performance of the overall system. It is also possible to store in the reserved location, data such as rebate information which can be enabled by the register, so that the customer can receive such information on its web site or have it printed.

More specifically, a reserved area is designated within the memory and within the reserved area, which is typically organized in blocks, a block that does not have manufacturing defect is identified and it is programmed with the "purchase" information and then designated as being "defective" by setting a flag. This is only to indicate to other applications not to use the reserved area and actually, the reserved area is not necessarily defective. This is known to the current application by yet another designation of a signature that is identified in the future indicating that the reserved block is o.k. and does actually include the "purchase" information.

An additional advantage of the "purchase" information is eliminating photo processing time. That is, since the customer's information is included in the purchased card, if, for example, the card is to be used to store photos, the processing time can be significantly reduced because the customer's information is already available on the card. Thus, each time the customer returns to the store for the processing of a new set of photos recently stored on the card, the card can be merely dropped off without any further information being requested by the store and can be picked up without much processing once the photos have been developed.

It should be noted that the card 18 of FIG. 1 or the card 26 of FIG. 2 includes non-volatile memory (in FIG. 1, this is shown as non-volatile memory 22 and in FIG. 2, this is shown as non-volatile memory 28) as memory. In fact, the "purchase" information ultimately resides in the reserved area within the non-volatile memory, or it can reside in a hard disk drive. Such non-volatile memory exhibits characteristics readily known to those of ordinary skill in the art, such as preserving the value which has been programmed therein even when power is disconnected. One of the applications of such non-volatile memory to store electronic photographs. Thus, the card 18 of FIG. 1 or the card 26 of FIG. 2 can be used as digital film, purchased by a consumer to use in a digital camera. This is however, only one application of many known to or perceived by those of ordinary skill in the art.

In FIG. 1, as stated earlier, the server 20 can be physically located within the retail store or may be physically located elsewhere. Typically, the server 20 is connected to a central server, which hosts many other servers as well. For example, a retail store such as Walmart, may have a server or two located within each of its retail chain stores and each of these servers would be such as server 20 and then the server 20 may be connected to a central server that is physically remotely located with respect to the server 20 and to which many other servers that serve the rest of the retail chain stores are connected.

In yet another embodiment of the present invention, the server 20 is not needed and the reader 16 is self-contained in that the software that resides within the server 20 to detect what type of card is being purchased and to then activate the latter, resides within the reader 16 rather than the server 20. However, a drawback with the latter embodiment is that if the reader 16 is stolen, which is likely to happen by an employee of the store or even a casual shopper, cards, such as the card 18, need not be purchased and can rather be stolen and programmed or activated by the stolen reader 16. This can be avoided by the use of the server 20 in that the server is not likely to be stolen given its large size and that it is generally located in a secure area within the store. Even if the reader 16 is stolen, the card 18 cannot be activated without the server 20.

In the case of the embodiment of FIG. 2, where the controller 30 is provided within the card 26, the server 20 and the controller 30 communicate using encryption, thus, making it harder for an outsider to intercept the information being communicated therebetween. Also, as mentioned hereinabove, the controller 26 can activate itself without the need for the reader 20 to do the same.

Now, a discussion of the "activation" of the card, such as cards 18 or 26, will be presented, with respect to the use of a "smart" card, such as the card 18, which does not include a controller and will use the reader 16 to activate the card. This discussion will be presented with reference to FIG. 3.

Figure 3:
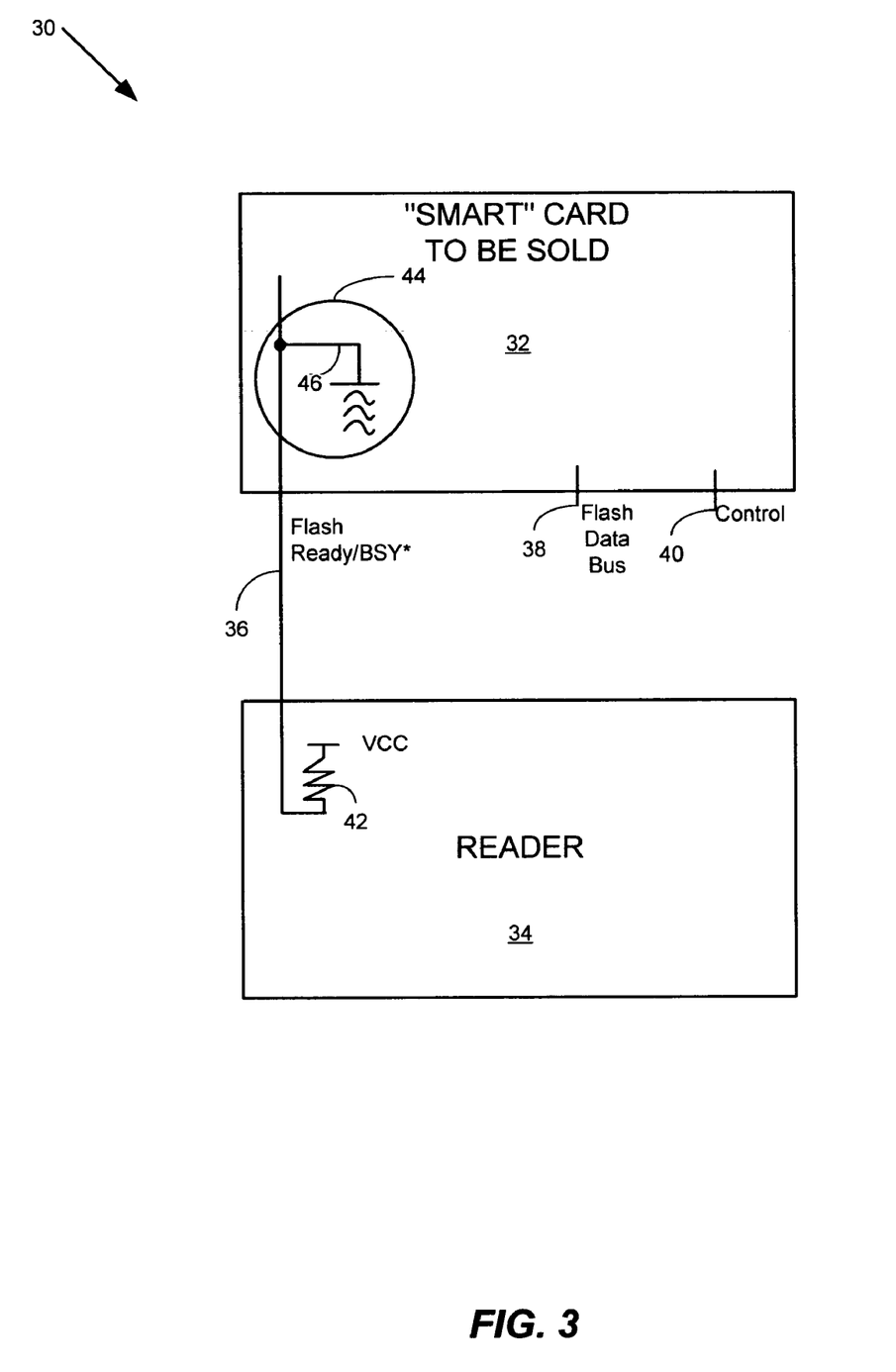
FIG. 3 illustrates an activation system 30 in accordance with an embodiment of the present invention.

In FIG. 3, an activation system 30 is shown in accordance with an embodiment of the present invention to include a "smart" card to be sold 32 coupled to a reader 34. As noted earlier, in the case of the smart card, no controller resides within the card 32, thus, the reader 34 includes a controller and is used to activate the card 32. Whereas, alternatively, if a card includes a controller, the activation can take place without the need for a reader as the card is self-contained including a controller circuit.

In FIG. 3, the card 32 is shown to include a flash ready/bsy* port 36, a flash data bus port 38 and a control port 40. The port 38 is used for transferring data between the card 32 and other electronic circuits, such as perhaps, the reader 34 although the same is not shown in FIG. 3. The control port 40 is used for transferring control signals to and from the card 32 and the flash ready/bsy* port 36 indicates whether the card 32 is accessible or busy and is used in the activation process. That is, the port 36 is connected to a pull-up resistor 42, which is connected to Vcc or a high logic state, within the reader 34 or a host of some sort. This creates an open drain signal such that prior to activation, the port 36 will indicate that the card is busy by being at a "low" logic state, as the other end of the port, within the card 32 is connected to ground by the fuse/switch 44.

When activation takes place, a large amount of current, such as one Amp, enough to "pop" or disconnect the fuse 44 is applied at 46 and when this occurs, the port 36 will go to a "high" logic state indicating that it is ready as opposed to busy and is then operational. It should be understood that more than one time is required for the application of enough current for the fuse 44 to blow. For example, current is applied at 46 for the first time in an effort to blow the fuse 44, then a timer is set within which time, it will be determined as to whether or not the card has become operational, i.e. the port 36 is at a ready state. The reader reads the port 36 after the application of current, if the port still appears to read as "busy" rather than "ready", a higher or the same amount of current is applied at 46 and the then the port 36 is read and again, if it is not at a ready state, still current is applied until the fuse 44 is blown within the time frame set by the timer. After the fuse is blown such that the port 36 is read as being ready, the card is declared operational. If the fuse is not blown by the time frame indicated by the timer, the card does not become operational and perhaps the process is repeated or another card is purchased.

Alternatively, no fuse is used; rather, the port 36 is controlled through firmware where it is programmed to be at a ready state. The latter is particularly practical when other than a smart card is used where the card includes a controller and the controller can then program the port 36. The embodiment of using firmware to program the port 36 is obviously faster than the embodiment of blowing the fuse.

Presently, in the market, there are many technologies using radio frequency (RF) for the purpose of reading information from a device/product and using the same for applications such as inventory handling, such is commonly referred to as RF identification (RFID).

But there are no products in the marketplace currently where RF can enable the product at the point of sale, such as presented in an embodiment of the present invention. There are products currently in the market, such as sensors, for detecting theft, however, this can be easily bypassed resulting in the theft of the product. Thus, point of sale enablement is the best way to discourage theft.

In another embodiment of the present invention, another method of enablement of a device is through RF communication with the device where a card can be enabled by a simple RF signal which can be basically an electronic 'short' circuit or 'open' bit or signal/switch to the internal circuitry. An example of such a method is illustrated in FIG. 4.

Figure 4:
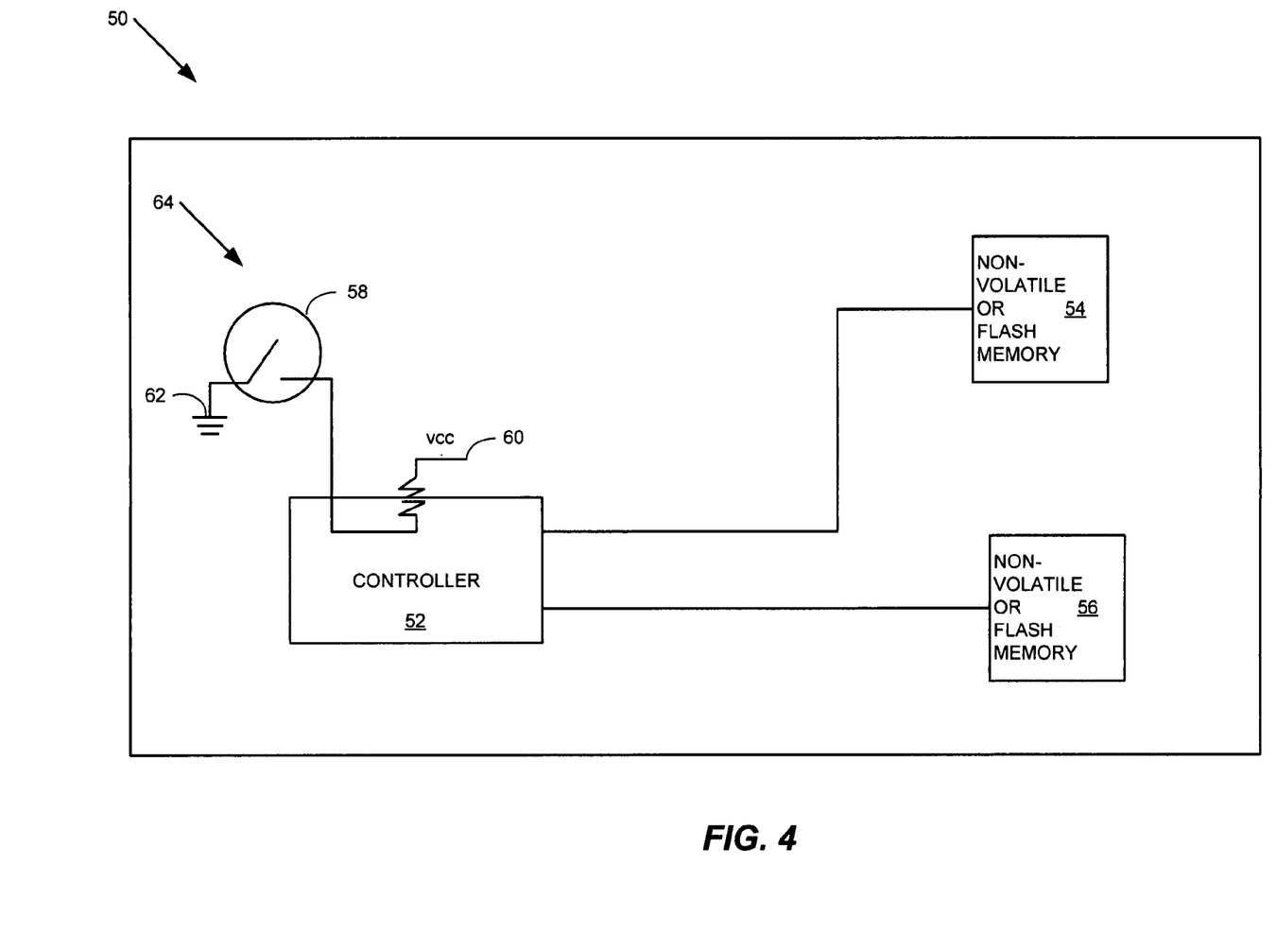
FIG. 4 shows an enablement/activation system 50 in accordance with an embodiment of the present invention.

In FIG. 4, an enablement/activation system 50 is shown, in accordance with an embodiment of the present invention, to include a controller 52 coupled to two or more nonvolatile or flash memory devices, 54 and 56. The controller is coupled to a switch 58, which can be caused to switch between Vcc at 60 or ground at 62. Depending on the programming or setting of the switch 58, the system 50 is enabled or not.

That is, the switch 58 acts as an open or short signal to the controller 52. In this mode, once the system 50, which can be in the form of an electronic card, is placed into an application slot or socket (not shown), the value of a signal 64, sensed at switch 58, is evaluated and if the sensed value is high or Vcc (generally 5V although any other value indicating a logic '1' or high state may be used), the card remains disabled. However, if the card has been through a proper scanner with the appropriate frequency having been applied thereto, the value at the signal 64 will indicate a state of zero because the switch 58 would have basically caused a short or grounded. In the latter case, the controller 52 will have been enabled and operational in the application socket, whereas, in the case where it was disabled, it would have been inoperational. For better security, the switch 58 is placed physically within the controller 52. Alternatively, the sense of the switch 58 can be implemented as a value in a register.

Figure 5:
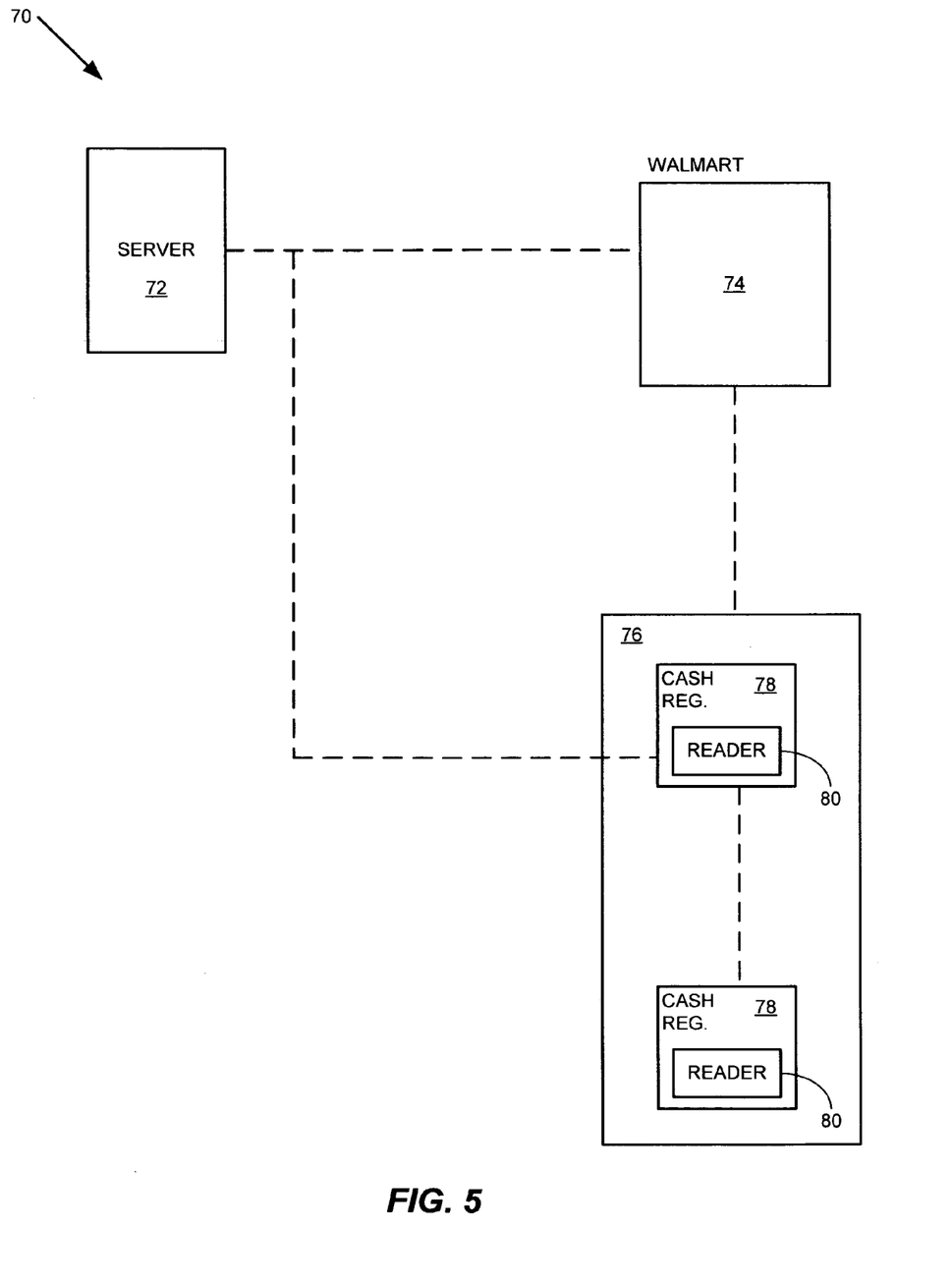
FIG. 5 shows another electronic card activation system 70 to present an application of an embodiment of the present invention.

In FIG. 5, another electronic card activation system 70 is shown to present an application of an embodiment of the present invention, as perhaps, used by the retail store Walmart. The system 70 is shown to include a server 72, a Walmart headquarter operation 74 and a local Walmart retail store 76. The server 72 is shown to be coupled to the operation 74 and the store 76. In fact, it makes sense for a large retail store, such as Walmart, to use a central server, such as the server 72. The operation 74 is shown linked to the store 76.

The store 76 is shown to include a number of cash registers 78 and each cash register is shown to include reader devices 80. The reader devices 80 operate to enable a card being purchased at the corresponding cash register by using the server 72.

Figure 6:
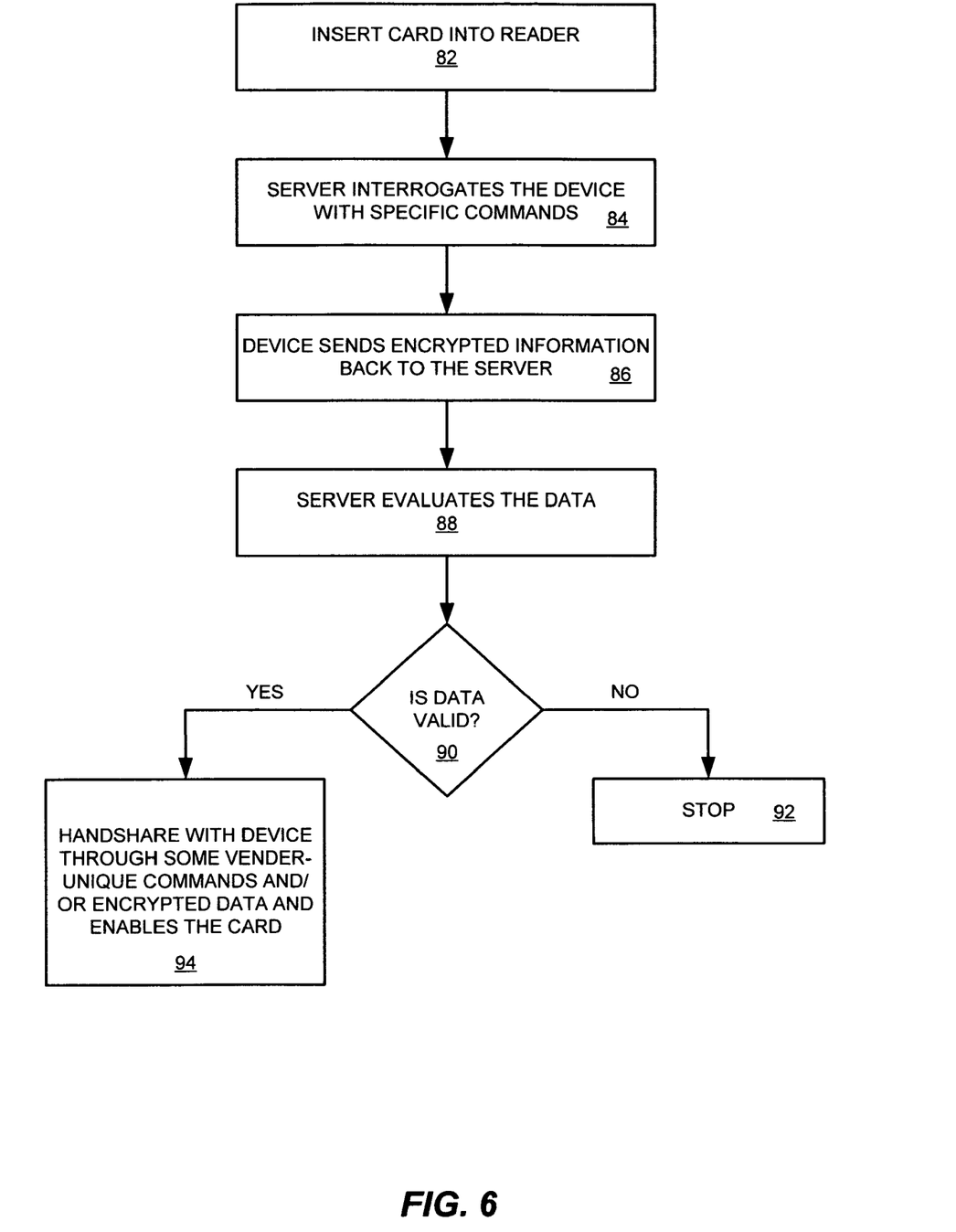
FIG. 6 shows a flow chard describing the operation of the system 70 of FIG. 5.

The operation of FIG. 5 is discussed in conjunction with the flowchart of FIG. 6. In FIG. 6, at step 82, a card (not shown) that is to be purchased by a customer of Walmart is inserted into one of the readers 80 of a corresponding cash register 78. Next, at step 84, the server 72 interrogates the card to be purchased (referred to as the 'device' or 'electronic device' in FIG. 6) with specific commands. Next, at step 86, the device sends encrypted information back to the server 72 regarding its identification. The server 72, at step 88, evaluates the received encrypted information and at 90, a determination is made as to the validity of the received information by the server 72. If at 90, it is determined that the data is not valid, the operation stops at 92 and the card or device is not activated or enabled, thus, the customer is unable to operate it as the card is rendered inoperational. However, at 90, if a determination is made that the data is valid, a handshake occurs between the server 72 and the device or card by using vender-unique commands and/or encrypted data and the card is enabled or activated thus being operational and usable by the customer.

In accordance with yet another embodiment of the present invention, a device, such as the card 18 of FIG. 1 or any other consumer electronic device, includes or is associated therewith a bar code including a password as a theft-prevention measure. The bar code appears on the card or packaging of the card as bar codes generally seen on products in stores for purchase. However, the bar code includes a password, which may be either in its raw format or encrypted or encoded in some fashion and as described hereinbelow. The password is generally embedded in the bar code so that upon reading the bar code the password becomes known. Verification of the password enables the card or device to operate properly, otherwise, the card or device remains inoperable and essentially useless thus discouraging theft thereof. To this end, perhaps, an example of such an anti-theft system will be helpful to the reader.

FIGS. 7-16 show yet another anti-theft embodiment(s) of the present invention, as will be discussed in detail below with respect to each figure but for now, suffice it to say that in the embodiments to follow, a product or device for purchase is displayed in a retail store. A potential user of the user, i.e. the customer, then wishes to purchase the device and the device is brought to the cash register to be purchased. At the cash register, the device is scanned by the salesperson using the Unique Product Code (UPC) of the device. The scanned code is processed by the server of the retail store and the scanned code is then encoded with a key (or another code) thereby generating a password that is then printed on a receipt that is provided to the customer.

A record of the sale of the device is then maintained by the retail store, such as in the retail store's server, i.e. the scanned code is recorded in the retail store's server for future verification of authorized sale of the device.

The customer or user then activates the device using the password in various ways, such as at a kiosk, at a home computer or other ways anticipated by those skilled in the art. Some of these methods of activation are discussed below, others, are anticipated.

The foregoing method may be employed for different reasons, one is obviously for security, another is for inventory, yet another reason is for product integrity.

Figure 7:
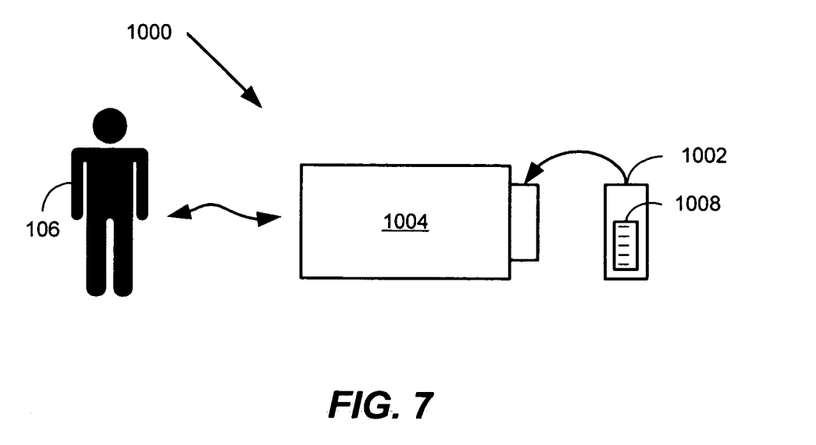
FIG. 7 shows an anti-theft system 1000 including a device 1002 to be purchased and to be coupled to a barcode reader 1004, which is operated by a salesperson 1006 located in a store.

FIG. 7 shows an anti-theft system 1000 including an electronic device 1002 to be purchased and to be coupled to a bar code reader 1004, which is operated by a salesperson 1006 located in a store. The device 1002 includes a bar code 1008, which is similar to bar codes appearing on products currently displayed for purchase in stores. However, the bar code 1008 includes a password, unknown to prior art systems, that may be one or more bits and that may appear as a raw value or encrypted or encoded in some manner. In alternative embodiments, the bar code 1008 of FIG. 7 may appear on the packaging of the device 1002 rather than on the device itself. Packaging is used for physical protection or security of the device. In fact, the bar code 1008 may appear in any location visible and readable by the reader 1004. In yet another embodiment, the password may be included in a bar code other than the bar code 1008, in other words, there may be two bar code being employed, one for the inclusion of the password and the other for use in purchasing the device. In yet other embodiments, the password may be included in values other than a code.

In operation, during purchase of the device 1008, the latter is presented to the salesperson 1006 for purchase and is then scanned, by the salesperson, to specifically scan or read the bar code 1008 of the device 1002 by coupling the device 1002 to the reader 1004 to allow reading of the bar code 1008 and verification thereof prior to purchase. It should be noted that without such verification, the device 1002 is essentially inoperable and thus rendered useless. The verification process includes confirmation or verification of a password assigned to the particular device 1002, which is unique to the latter and that will be discussed in further detail hereinbelow.

The reader 1004 reads the bar code 1008 and upon reading the same, the reader 1004 becomes aware or deciphers the password embedded in the bar code 1008. The password (not shown in FIG. 7) is then printed on a receipt that is presented to the user or purchaser of the device 1002 upon completion of purchase of the device. The user ultimately enters such a password prior to using the device 1002 and upon verification of the password, the device 1002 is enabled for use. Thus, for example, if the device 1002 is digital film or a storage device, it is enabled for use where electronic images may be stored therein after verification of the password. That is, upon verfication of the password, the device 1002 becomes readable and/or writable.

Figure 8:
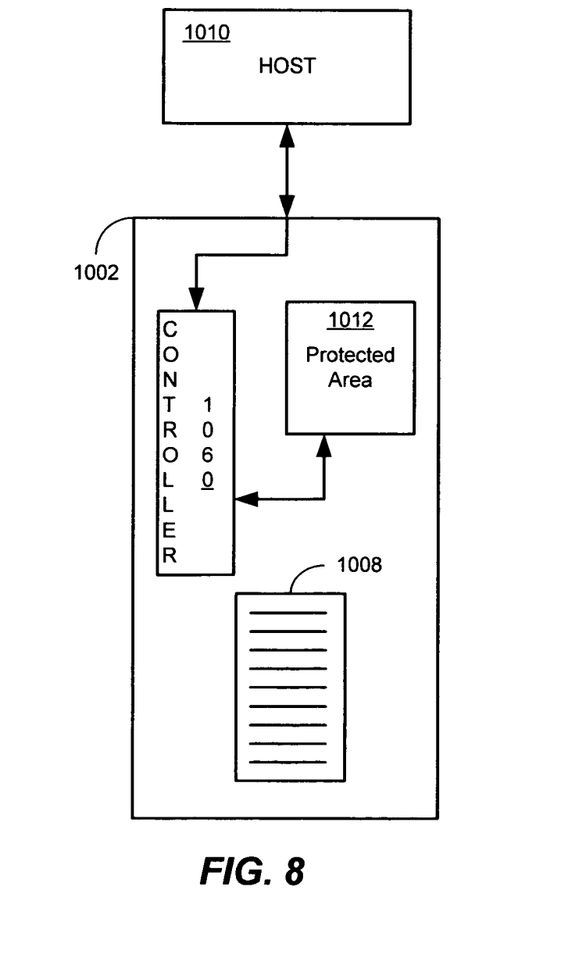
FIG. 8 shows the device 1002 coupled to the host 1010 and including the bar code 1008 and a protected area 1012, which is an area located in non-volatile memory or other storage media that is not alterable by a user.

FIG. 8 shows the device 1002 coupled to the host 1010 and including the bar code 1008 and a protected area 1012, which is an area located in non-volatile memory or other storage media that is not alterable by a user. The protected area 1012 is used to store code or software for execution thereof and for the sole purpose of verifying the password and ultimately enabling the device 1002 upon verification of the password.

FIGS. 10-13 show, in flow chart form, the steps performed by the system 1000 and the device 1002 during production of the device 1002, the sale of the device 1002, the use of the device 1002 and the application of the device 1002.

Figure 10:
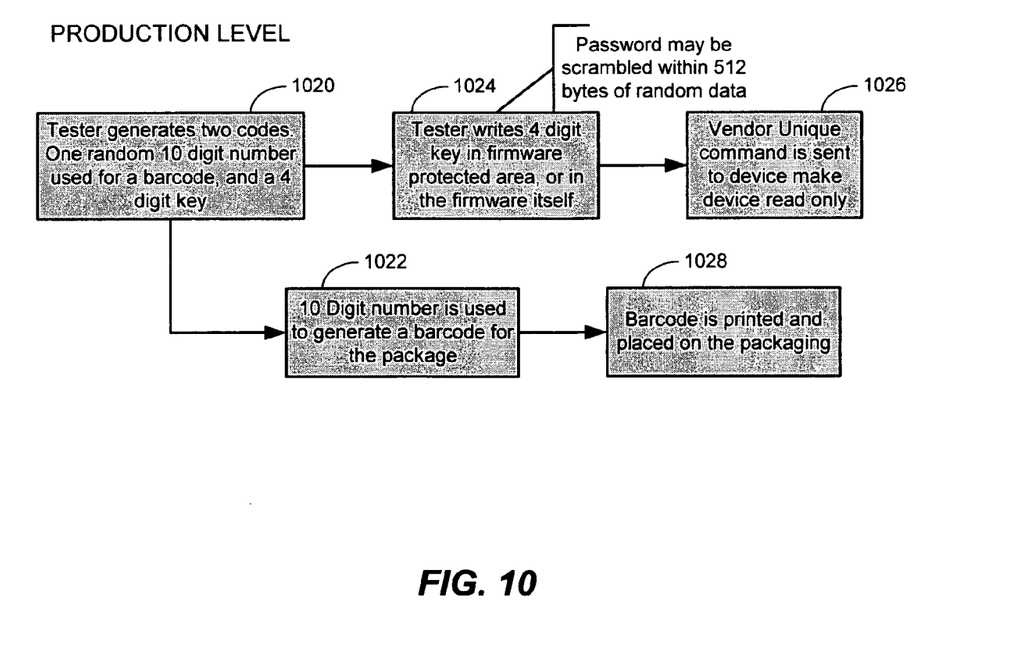
FIGS. 10-13 show, in flow chart form, the steps performed by the system 1000 and the device 1002 during production of the device 1002, the sale of the device 1002, the use of the device 1002 and the application of the device 1002.

FIG. 10 shows the steps performed during manufacturing or production of the device 1002. At 1020, two codes are generated by a unit that is used to test the device 1002, i.e. the tester. One of these two codes is used to generate the bar code, or the bar code 1008 and another is a key, which is an 'n' digit value used as password. In the example that is being discussed, the key is four digits and the code that is used to generate the bar code is a ten digit value. At 1022, the ten digit code or number is used to generate the barcode 1008. At 1024, the tester stores the four digit key in a protected area. An example of a protected area is in the same area that is used to store firmware (executable code), i.e. an area of memory within the device 1002 for storing firmware and that can be read only by the manufacturer of the device 1002.

At 1026, a vendor unique command is sent to the device 1002 causing the device 1002 to be inoperable as to any function it is intended on performing except for the purpose of verifying the password. After 1022, at 1028, the bar code 1008 that was generated at 1022 is printed and placed on either the packaging of the device 1002 or the device 1002 itself.

Figure 11:
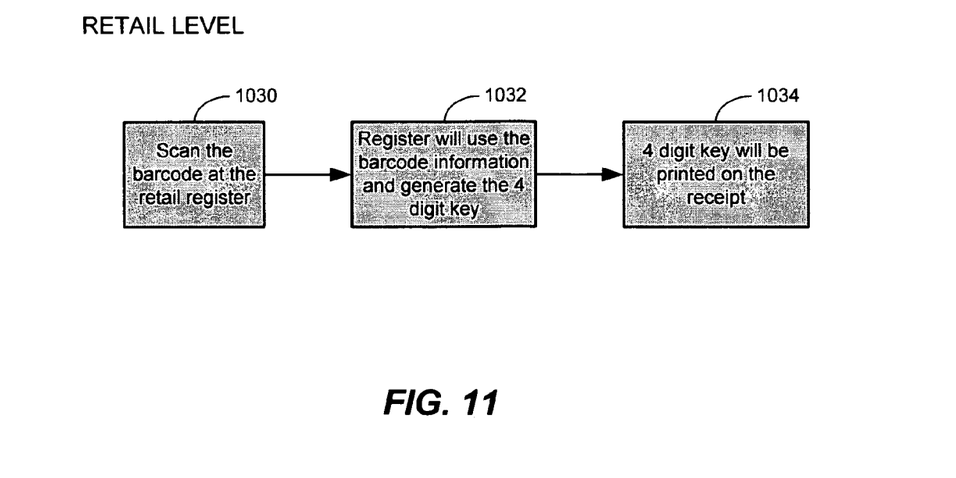

FIG. 11 shows the steps performed at the time of sale of the device 1002. At 1030, the bar code 1008 is scanned by the reader 1004. Next, at 1032, the bar code is used to generate a four-digit key or password, which may be any 'n' or integer number of digits and need not be four. There are various ways in which the key is generated, which will be discussed in further detail below. This is performed either by the reader 1004 of FIG. 7 or by a cash register. Next, at 1034, the key or password is printed on a receipt that is provided to the customer.

In one embodiment of the present invention, the password is a raw value that appears as a part of or embedded within the bar code 1008. The password or key may be 'n' digits. In another embodiment of the present invention, the password is encoded such that the bar code 1008 alone will not reveal the actual value of the password. Such encoding may be done using any known encoding schemes.

Figure 9:
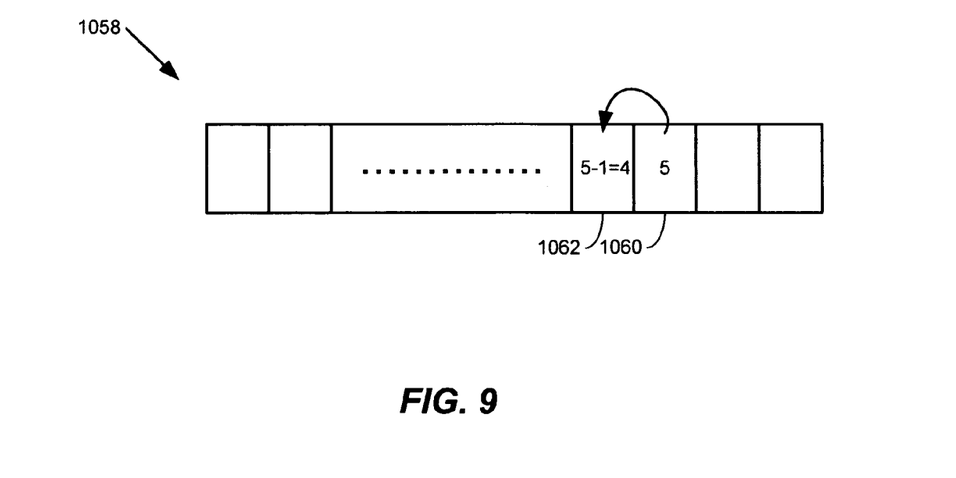
FIG. 9 shows yet another embodiment of the present invention wherein each or a portion of the bits of the password reveal a code used to identify an adjacent or remaining bit.

In yet another embodiment of the present invention, an example of which is provided in FIG. 9, each or a portion of the bits of the password reveal a code used to identify an adjacent or remaining bit. An example of such a coding of every or some bits is shown in FIG. 9 such that the password 1058 includes the value '5' at location 1060 meaning that the value adjacently to the left thereof, or at 1062, is a value resulting the value at location 1060, or 5, minus '1', which is the value '4'. Any algorithm or coding may be employed to generate adjacent or other bits of the password 1058.

Figure 12:
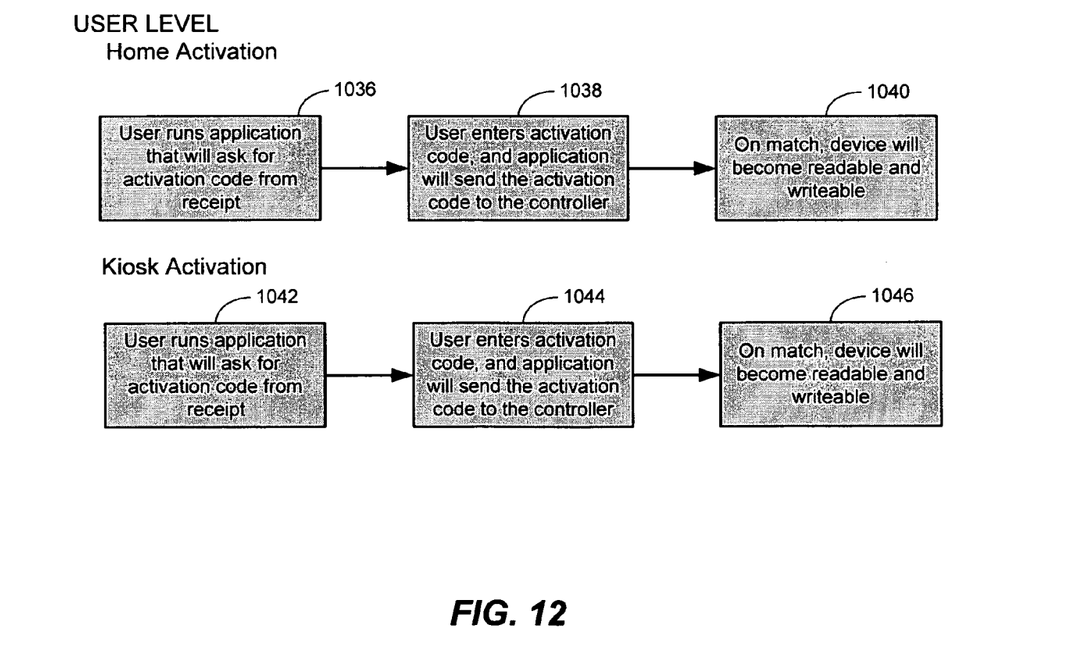

In FIG. 12, steps for the activation of the device 1002 after purchase thereof are shown. Steps 1036-1040 show the activation process for home activation and steps 1042-1046 show the activation process for store or kiosk activation right after the purchase of the device in the store.

At 1036, due to the execution of a software program, located in the protected area 1012 of FIG. 7, an activation code or password is requested of the purchaser, user or customer. The code or password appears on the customer receipt, as noted with reference to FIG. 11. Next, at 1038, the user enters the activation code or password, which is then sent to a controller, such as the controller 1060 of FIG. 8, shown coupled to the host 1010. A comparison is made of the activation code entered by the customer and that which is stored in the purchased device and particularly in the protected area 1012. Upon the detection of a match or successful comparison of the customer-provided activation code and the stored activation code, the device 1002 is declared and becomes readable and writeable. From this point on, the device 1002 can be used, as it is intended to function, by the customer.

Another manner for accomplishing proper operation of the device is to activate the device at the store or kiosk. That is, in FIG. 12, at step 1042, a customer or user inserts the device 1002, an example of which may be a memory card, into a (media) reader and the customer is then asked for the activation code or password, which is obtained, as described hereinabove. Next, at 1044, the customer enters the activation code and the activation code is provided to the controller 1060. Next, the customer-provided activation code is compared with an activation code that is stored in the controller 1060 and if a match is detected, at 1046, the device 1002 becomes readable and writeable, i.e. operational. If a match is not detected either at the store/kiosk or during home activation, the device 1002 maintains its status of limited access and will not be operational in a manner intended.

Yet another way of activating the device 1002, which is not depicted in the figures herein is to have the customer enter the activation code or password in a website, such as in the website of the manufacturer of the device. The activation code would then be provided to the controller for comparison in a manner as described hereinabove.

Figure 13:
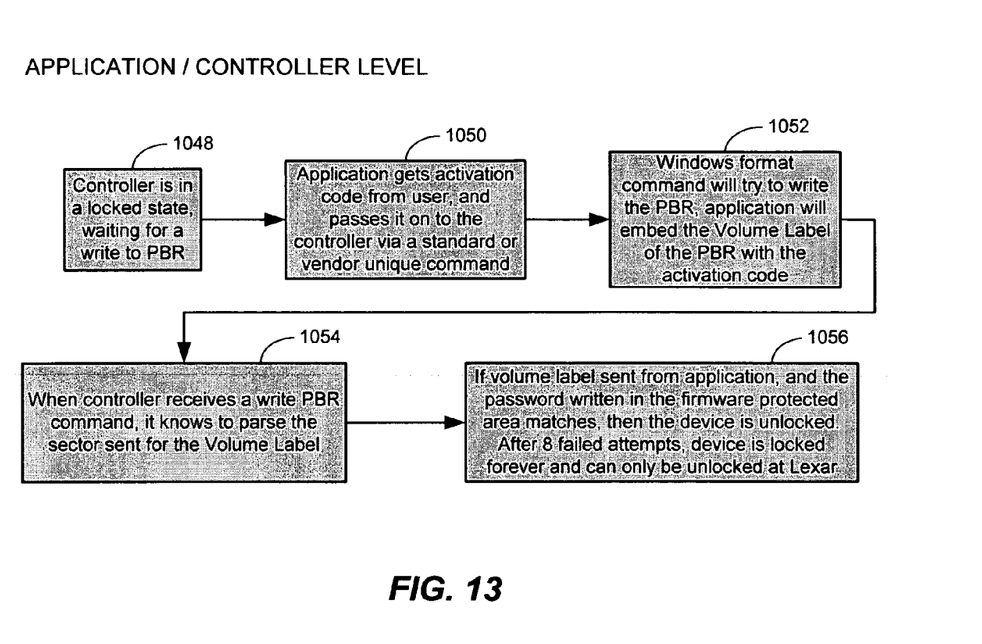

FIG. 13 is an example of how the device is activated at step 1040 without using a vendor unique command. It should be understood that other methods of implementing password match may be used for activating the device.

In FIG. 13, at step 1048, the controller 1060 is in a locked state, i.e. inoperable, and awaiting a write operation to the partition boot record (PBR). Next, at step 1050, the software program of step 1036 that is being executed receives an activation code from the user 1006 and passes the received activation code onto the controller 1060 via a standard or vendor unique command. Next, at step 1052, using a Windows Operating System standard format command, the PBR is attempted to be written and a volume label of the PBR is embedded with the activation code. A volume label is a letter that is assigned by a personal computer manufacturer or operating system manufacturer to a drive, for example, the letter "C:" is normally assigned to the hard disk drive of a computer and other letters are assigned to identify other drives. Next, at 1054, when the controller 1060 receives a write PBR command, it parses the sector that was sent for the volume label. Next, at 1056, if the volume label is sent from the software application being executed, and the password written in the firmware or protected area 1012 match, the device 1002 is unlocked, otherwise, a predetermined number of failed attempts is allowed before the device is permanently locked and can then only be unlocked by the manufacturer of the device, such as Lexar Media, Inc. of Fremont, Calif. An exemplary embodiment will allow a total number of eight attempts to match the password, although, other number of matches may be employed.

Figure 14:
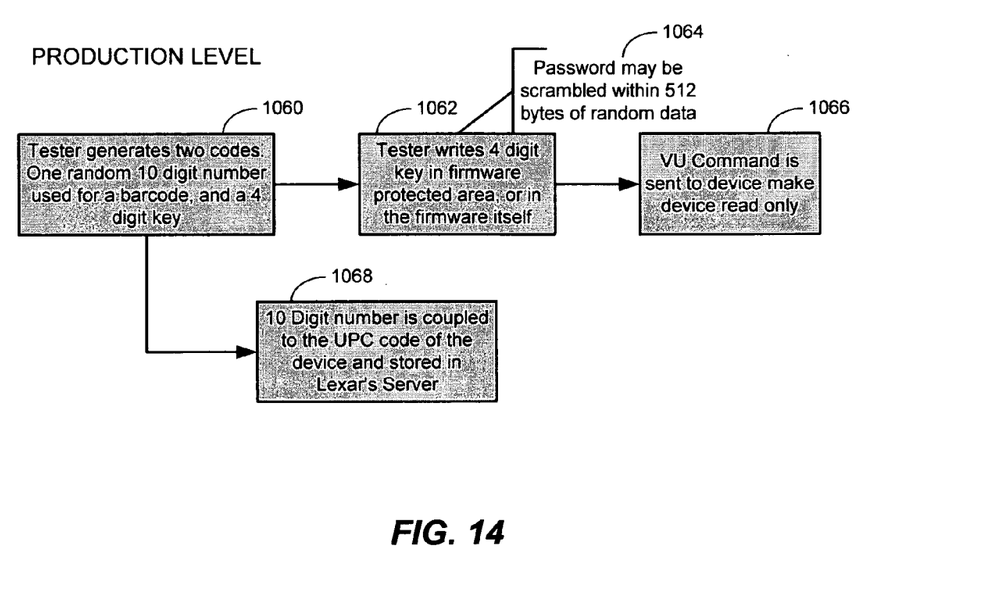
FIGS. 14-16 show various processes performed when the device 1002 is being activated on the Web or Internet, i.e. Web-activation.
Figure 15:
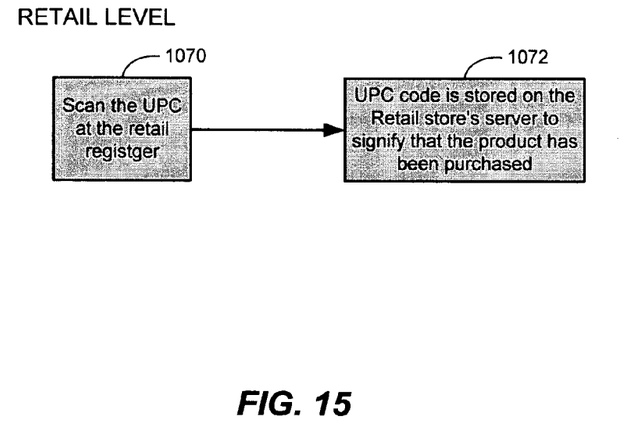
Figure 16:
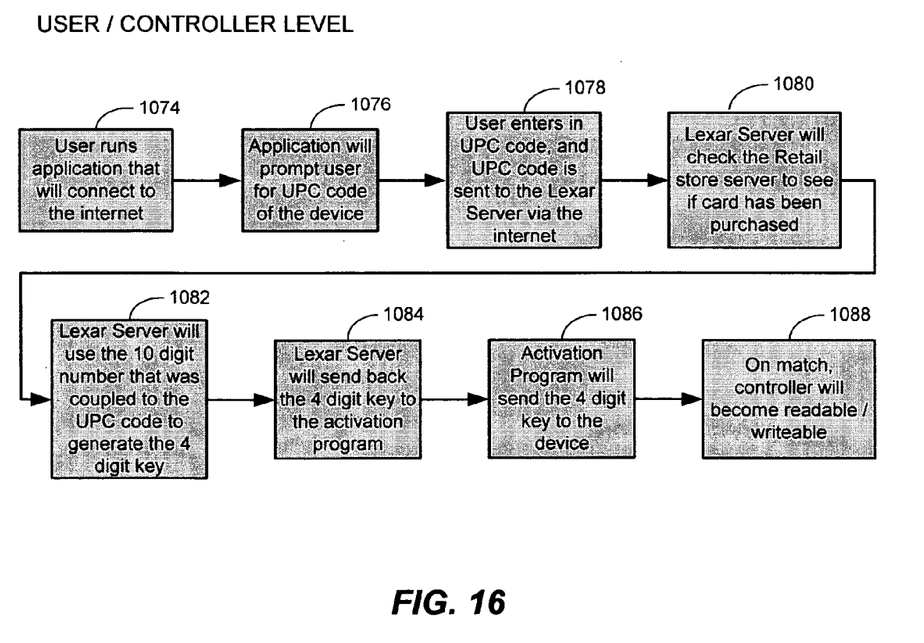

FIGS. 14-16 show various processes performed when the device 1002 is being activated on the Web or Internet, i.e. Web-activation.

In FIG. 14, at the level of production of the device 1002, at 1060, a tester generates two codes, a first code is a random number that is 10 digits in an exemplary embodiment but can be more or less digits in other embodiments, the code is used as a bar code and the second code is a four digit code in an exemplary embodiment but may be other number of digits. At 1062, the tester writes the second code in the protected area 1012 or in the area where the firmware or software code is located. Next, optionally, at 1064, the password is scrambled within 512 bytes (or a sector size of data bytes) of random data. In other embodiments, the password is not scrambled, thus, step 1064 is avoided.

Next, at 1066, a vendor unique command is sent to the device 1002 in order to render the device 1002 as a read-only device to avoid undesirable alteration of its contents. After 1060, at 1068, the first code is coupled to the Unique Product Code (UPC) (or bar code) of the device 1002 and the coupled value is stored in the manufacturer's server. The UPC (or bar code) is the bar code appearing on a product displayed for purchase that is currently used on most products.

In FIG. 15, a retail level processes are shown where at 1070, the UPC associated with the device 1002 that is now on display for purchase and the user 1006 has decided to purchase the same is scanned at the retail register, such as 12 of FIG. 1. The UPC is then stored on the retail store's server, at 1072, to signify that the device 1002 has been purchased and the UPC is then printed on the receipt provided to the customer/user upon purchase of the device 1002.

FIG. 16 shows steps or processes, at the user/controller level, where the user has already purchased the device 1002 and wishes to activate the device 1002. At 1074, the user executes application to connect to the Internet. Next, at 1076, the application prompts the user for UPC of the device 1002. At 1078, the user enters the UPC and the UPC is sent to the manufacturer (such as Lexar Media Inc.) via the Internet. Next, at 1080, the manufacturer's server checks the retail store's server, the retail store being the store in which the user purchased the device, to verify purchase of the device 1002. As a reminder, the UPC was stored in the retail store's server at step 1072 of FIG. 15 and this is what the manufacturer server checks for verification of purchase of the device 1002 at 1080.

Next, at 1082, the manufacturer's server uses the first code that was coupled to the UPC at step 1068 of FIG. 14, to generate the second code (or key). As previously stated, the first code in one embodiment of the present invention is a 10 digit code and the second code in one embodiment of the present invention is a four digit code. Next, at 1084, the manufacturer's server returns the second code (or key) to an activation program. Next, at 1086, the activation program sends the second code to the device 1002 and a comparison operation is performed between the second code and the key that is stored in the protected area 1012. If a match between the second code and the key that is stored in the protected area 1012 is found, the device 1002 becomes operable and it is thereafter capable of being written thereto and being read therefrom.

It should be understood that wherever use of the vendor unique command is indicated herein, other types of identification may be employed with any known interface without departing from the scope and spirit of the present invention. It should also be understood that wherever the structure or term 'server' is used in the foregoing, any other storage device may be employed without departing from the scope and spirit of the present invention.

Although the present invention has been described in terms of specific embodiments it is anticipated that alterations and modifications thereof will no doubt become apparent to those skilled in the art. It is therefore intended that the following claims be interpreted as covering all such alterations and modification as fall within the true spirit and scope of the invention.

What is claimed is:

1. A method for reducing the incidence of theft of an electronic device for purchase comprising:
   generating a first code uniquely identifying an electronic device, during manufacturing of the device that is only known to the manufacturer of the device, for purchase;
   generating a second code;
   embedding a password including the second code in the first code;
   storing the second code in a protected area that is in a non-volatile location within the device and accessible only by use of a vendor unique command;
   during purchase of the device, determining if the device comprises a controller;
   if the device comprises a controller, the controller receiving an encrypted version of the password that is decrypted to a decrypted password;
   comparing a portion of the decrypted password with the stored code; and
   upon successful comparison of the portion of the decrypted password with the stored code, allowing activation of the device.

2. A method for reducing the incidence of theft of an electronic device for purchase comprising:
   generating a code uniquely identifying an electronic device for purchase;
   authenticating the device using the code;
   during purchase of the device, determining if the device comprises a controller;
   during purchase of the device and if the device comprises a controller, enabling operation of the device using radio frequency (RF) over an encrypted communication that is decrypted by the controller; and
   upon lack of authentication, avoiding enabling operation of the device.

* * * * *